(12) United States Patent
Tamai et al.

(10) Patent No.: US 6,762,595 B2
(45) Date of Patent: Jul. 13, 2004

(54) POWER DISTRIBUTION SYSTEM

(75) Inventors: Yasuhiro Tamai, Shizuoka (JP); Tetsuya Hasegawa, Shizuoka (JP)

(73) Assignee: Yazaki Corporation, Tokyo (JP)

(\*) Notice: Subject to any disclaimer, the term of this patent is extended or adjusted under 35 U.S.C. 154(b) by 0 days.

(21) Appl. No.: 10/319,598

(22) Filed: Dec. 16, 2002

(65) Prior Publication Data

US 2003/0137285 A1 Jul. 24, 2003

(30) Foreign Application Priority Data

Jan. 21, 2002 (JP) .................................... P2002-012070

(51) Int. Cl.[7] .............................................. G05F 1/563
(52) U.S. Cl. ........................ 323/266; 323/267; 363/65; 363/72
(58) Field of Search ............................... 323/266, 267; 363/15, 65, 72

(56) References Cited

U.S. PATENT DOCUMENTS 5,534,768 A * 7/1996 Chavannes et al. ......... 323/267
5,751,150 A * 5/1998 Rippel et al. ............... 324/537
6,400,589 B2 * 6/2002 Abo et al. .................... 363/65
6,441,590 B1 * 8/2002 Amantea et al. ............ 323/266

FOREIGN PATENT DOCUMENTS

JP          10-84626 A        3/1998

\* cited by examiner

*Primary Examiner*—Jeffrey Sterrett
(74) *Attorney, Agent, or Firm*—Sughrue Mion, PLLC (57) ABSTRACT

When an ignition switch is off, even if a master CPU (20a) receives a predetermined command signal, the master CPU (20a) does not immediately transmit an activating signal to slave CPUs (20b). At this time, power necessary for an electronic control unit (8c) is being supplied from a standby-current supplying converter (10). The master CPU (20a) transmits an activating request signal to a controller (12) to activate a normal supplying converter (9). The controller (12), after activating the normal supplying converter (9), transmits an activating completion signal to the master CPU (20a). For the first time upon receipt of this activating completion signal, the master CPU (20a) transmits the activating signal to the slave CPUs (20b). Consequently, power is supplied from the normal supplying converter (9) to all the electronic control units (8c to 8f).

9 Claims, 11 Drawing Sheets

POWER DISTRIBUTION SYSTEM

BACKGROUND OF THE INVENTION

The present invention relates to a power distribution system which can be mounted in various vehicles including motor vehicles, and more particularly to a power distribution system for distributing and supplying electric power to various electric loads in a vehicle.

As an example of conventional vehicles, a motor vehicle in which a 14-V output power supply unit having an alternator and a rechargeable 12-V battery is mounted (i.e., a so-called 14-V vehicle) is known. A power distribution system which is applied to this 14-V vehicle is comprised of a junction box for receiving the power supply of a high voltage (e.g., 14 V) from the power supply unit, as well as a plurality of electronic control units electrically connected to this junction box through a plurality of power lines. Incorporated in each electronic control unit is a series regulator which receives the high-voltage power distributed from the junction box through a power line. In this power distribution system, the electric power of a high voltage in the junction box is converted to electric power of a low voltage (e.g., 5 V) by each series regulator which functions as a voltage converting unit, and the electric power of the low voltage thus converted is supplied to a plurality of electric loads which are electrically connected to each electronic control unit.

In recent years, development of high-voltage vehicles in which a power supply unit with a 42-V output having a motor/generator and a rechargeable 36-V battery is mounted and which is advantageous in fuel consumption (i.e., so-called 42-V vehicles) is underway. If the above-described power distribution system is applied to this 42-V vehicle, the conversion efficiency is extremely poor, and the generation of large heat entails. This is primarily because the difference between the input voltage value and the output voltage value of the series regulator is large. If the output voltage (i.e., the voltage for the electric load) of the series regulator is specifically assumed to be 5 V, for example, the conversion efficiency of the series regulator in the 14-V vehicle becomes approx. 35.7% from the arithmetic expression (100%−((14 V−5 V)/14 V×100%)), whereas the conversion efficiency of the series regulator in the 42-V vehicle becomes approx. 11.9% from the arithmetic expression (100%−((42 V−5 V)/42 V×100%)). Namely, if the output voltage at the series regulator is assumed to be fixed, the higher the input voltage at the series regulator, the more the conversion efficiency drops, which causes heat to be generated in various elements in the series regulator. For this reason, it is conceivable to incorporate a switching regulator in each electronic control unit instead of the series regulator as the voltage converting unit exhibiting higher conversion efficiency than the series regulator.

However, in the case of the switching regulator for supplying power to an electric load whose power consumption changes substantially between an active state and a standby state in such as an electronic control unit for a keyless entry system, if the design is made such that the conversion efficiency becomes high when the electric load is heavy (i.e., at the time of the active state when the load current is large), the conversion efficiency at the time when the electric load is light (i.e., at the time of the standby state when the load current is very small) is poor. With such a switching regulator, even in a case where a very small load current (i.e., standby current) is supplied to an electric load in the standby state, there is a large amount of unwanted dark current due to its poor conversion efficiency, which results in large power consumption of the battery and is therefore undesirable. To solve this problem, it is conceivable to provide a power distribution system in which all the electronic control units requiring standby current are provided with a standby-current supplying unit, and power is supplied by the switching regulator at the time when an ignition switch is on (i.e., in the active state), where as power is supplied by a standby-current supplying unit when the ignition switch is off (i.e., in the stand by state).

However, in such a power distribution system, the respective electronic control units need to be provided with expensive switching regulators, and all the electronic control units requiring standby current need to be further provided with the standby-current supplying unit. Therefore, there is a problem in that the power distribution system becomes very expensive.

Figure 11:
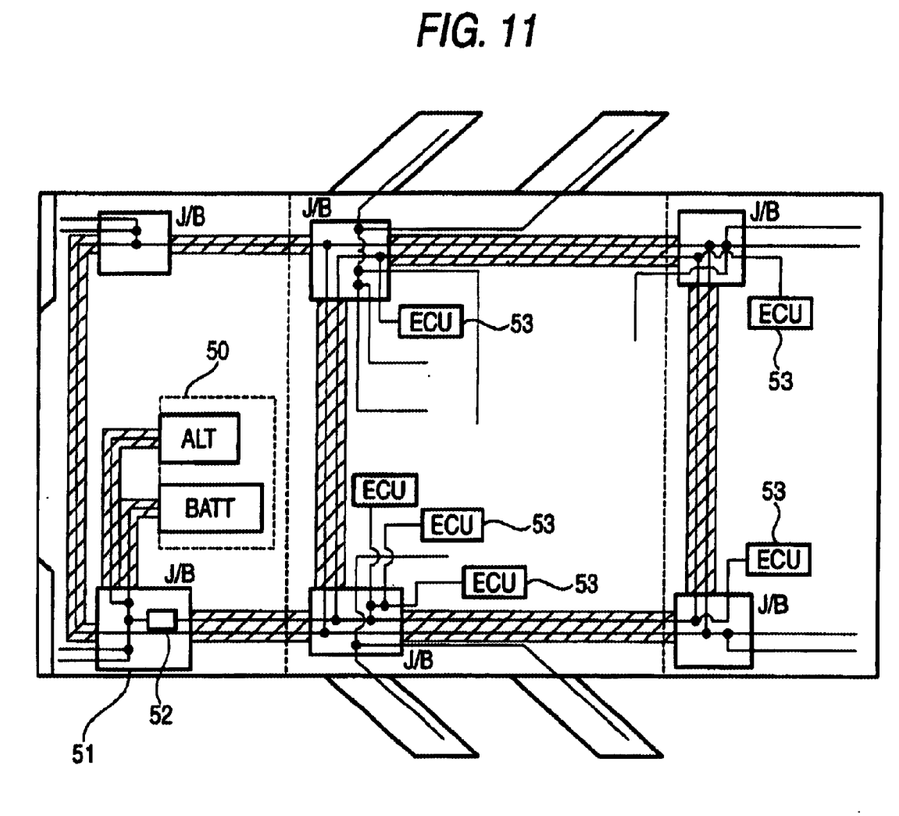
FIG. 11 is a diagram illustrating a power distribution system disclosed in JP-A-10-84626.

FIG. 11 shows a power distribution system disclosed in JP-A-10-84626. As shown in FIG. 11, a voltage converting unit 52 is provided in a junction box 51 to which electric power of a high voltage is supplied from a power supply unit 50, this voltage converting unit 52 converts the electric power of a high voltage to electric power of a low voltage (e.g., 5 V), and the electric power of the low voltage is collectively distributed to respective electronic control units 53. According to this power distribution system, since it suffices to provide at least one voltage converting unit 52, it is possible to structure a low-cost power distribution system.

However, in the conventional power distribution system shown in FIG. 11, if power is supplied from the voltage converting unit 52 to distantly located electric loads, a voltage drop is liable to occur, and if consideration is given to the arrangement of the voltage converting unit 52 so that power will not be distantly supplied to electric loads, the number of a voltage converting unit 52 increases and results in higher cost. Furthermore, the voltage converting unit 52 must be designed so that the accuracy of the output voltage, temperature characteristics, and the like of the voltage converting unit 52 conform to the electric load whose requirements are most stringent among the plurality of electric loads. To design the voltage converting unit so as to satisfy the stringent requirements leads to the higher cost of the power distribution system.

Since variations are likely to occur in the output from the voltage converting unit 52 owing to the increase and decrease of the load current, it is difficult to supply electric power of high accuracy to a plurality of electric loads. In a case where power is supplied from the voltage converting unit 52 to an electric load whose power consumption varies substantially between the active state and the standby state as in, for example, the electronic control unit for a keyless entry system or the like, if the design is made such that the conversion efficiency of the voltage converting unit 52 becomes high at the time of the active state when the load current is large, the conversion efficiency at the time of the standby state when the load current is very small is poor. In such a voltage converting unit 52, even in the case where a very small standby current is supplied to the electric load in the standby state, there is a large amount of unwanted dark current due to its poor conversion efficiency, which results in large power consumption of the battery and is therefore undesirable.

SUMMARY OF THE INVENTION

The invention has been devised in view of the above-described problems, and its object, among others, is to provide a power distribution system which is capable reducing the unwanted dark current.

In order to solve the aforesaid object, the invention is characterized by having the following arrangement.

(1) A power distribution system comprising:
- an upper power distribution unit connected to a power supply unit through a high-voltage power line for receiving power supply of a high voltage from the power supply unit;
- a plurality of lower power distribution units connected to the upper power distribution unit through a plurality of intermediate-voltage power lines for receiving from the upper power distribution unit power supply of an intermediate voltage lower than the high voltage, converting the intermediate voltage to a load-use voltage lower than the intermediate voltage and supplying power to electric loads, respectively;
- a normal supplying converter provided in the upper power distribution unit for converting the high voltage to the intermediate voltage and supplying the power of the intermediate voltage to the plurality of intermediate-voltage power lines;
- a standby-current supplying converter connected in parallel to the normal supplying converter in the upper power distribution unit for converting the high voltage to the intermediate voltage and supplying the power of the intermediate voltage to one of the plurality of intermediate-voltage power lines;
- a controller provided in the upper power distribution unit for changing the driving between the normal supplying converter and the standby-current supplying converter;
- a master CPU provided in the lower power distribution unit to which power can be supplied from the standby-current supplying converter through the one of the plurality of intermediate-voltage power line, constituting at least a portion of the electric load; and
- at least one slave CPU provided in the lower power distribution units other than the lower power distribution unit having the master CPU, constituting at least portions of the electric loads,
- wherein the master CPU activates the normal supplying converter in accordance with a predetermined command signal inputted when power is supplied from the standby-current supplying converter to the lower power distribution unit having the master CPU, whereby power is supplied from the normal supplying converter to the plurality of lower power distribution units to drive the electric loads, respectively.

(2) The power distribution system according to (1), wherein the master CPU transmits an activating request signal to the controller to activate the normal supplying converter.

(3) The power distribution system according to (2), wherein the controller transmits an activating completion signal to the master CPU after activating the normal supplying converter, and the master CPU transmits an activating signal to the at least one slave CPU.

(4) The power distribution system according to (1) further comprising a timer circuit which is connected to the master CPU, and stores predetermined time required for the normal supplying converter to reach an active state from a stopped state,
- wherein in accordance with a predetermined command signal inputted to the controller and the timer circuit when the standby-current supplying converter is driven, the controller activates the normal supplying converter and the timer circuit counts time until reaching at at least the predetermined time, the timer circuit transmits an activating completion signal to the master CPU after the predetermined time is reached, and the master CPU transmits an activating signal to the at least one slave CPU, whereby power is supplied from the normal supplying converter to the plurality of lower power distribution units to drive the electric loads, respectively.

(5) The power distribution system according to (1), further comprising a comparator provided in the lower power distribution unit having the master CPU for inputting to the master CPU a determination signal representing whether the voltage at the intermediate-voltage power line is a first intermediate voltage or a second intermediate voltage,
- wherein the normal supplying converter converts the high voltage to the first intermediate voltage, and the standby-current supplying converter converts the high voltage to the second intermediate voltage different from the first intermediate voltage, and
- wherein the master CPU transmits an activating signal to the at least one slave CPU in response to a determination signal of the comparator representing the first intermediate voltage, whereby power is supplied from the normal supplying converter to the plurality of lower power distribution units to drive the electric loads, respectively.

(6) The power distribution system according to (5), wherein the first intermediate voltage is higher than the second intermediate voltage.

(7) The power distribution system according to (1), further comprising: series regulators respectively provided in the lower power distribution units for convert the intermediate voltage to the load-use voltage,
- wherein the normal supplying converter has high conversion efficiency of input/output power when the electric load is heavy, whereas the standby-current supplying converter has high conversion efficiency of input/output power when the electric load is light.

(8) The power distribution system according to (1) further comprising a detection sensor for detecting current supplied from the upper power distribution unit to the lower power distribution unit,
- wherein the controller stops the standby-current supplying converter and activate the normal supplying converter on the basis of the current value detected by the detection sensor.

(9) The power distribution system according to (8), wherein when an ignition is changed over from off state to on state, the controller stops the standby-current supplying converter and activate the normal supplying converter on the basis of the current value detected by the detection sensor irrespective of the current value detected by the current detection sensor.

The invention has been described briefly above. Furthermore, upon perusal of the embodiments of the invention which are described below with reference to the accompanying drawings, the details of the invention will be clarified further.

The present disclosure relates to the subject matter contained in Japanese patent application No. 2002-012070 (filed on Jan. 21, 2002), which is expressly incorporated herein by reference in their entireties.

DETAILED DESCRIPTION OF PREFERRED EMBODIMENTS

Figure 1:
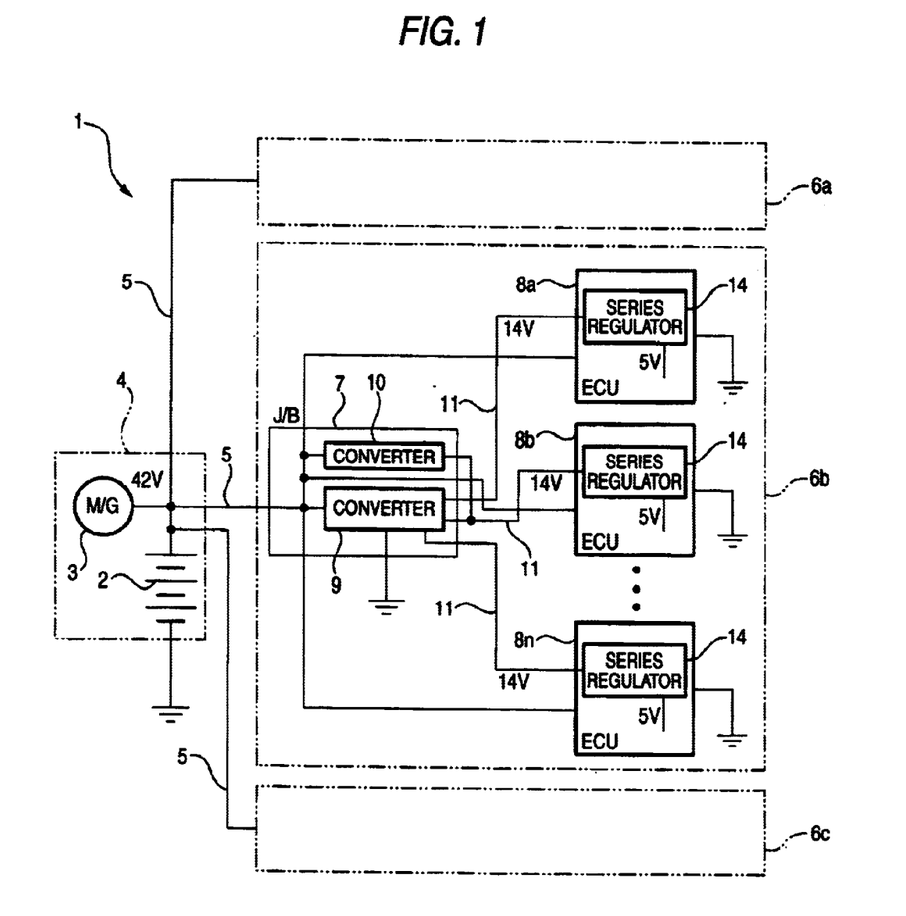
FIG. 1 illustrates a first embodiment of the invention, and is a block circuit diagram illustrating a schematic configuration of a power distribution system.
Figure 2:
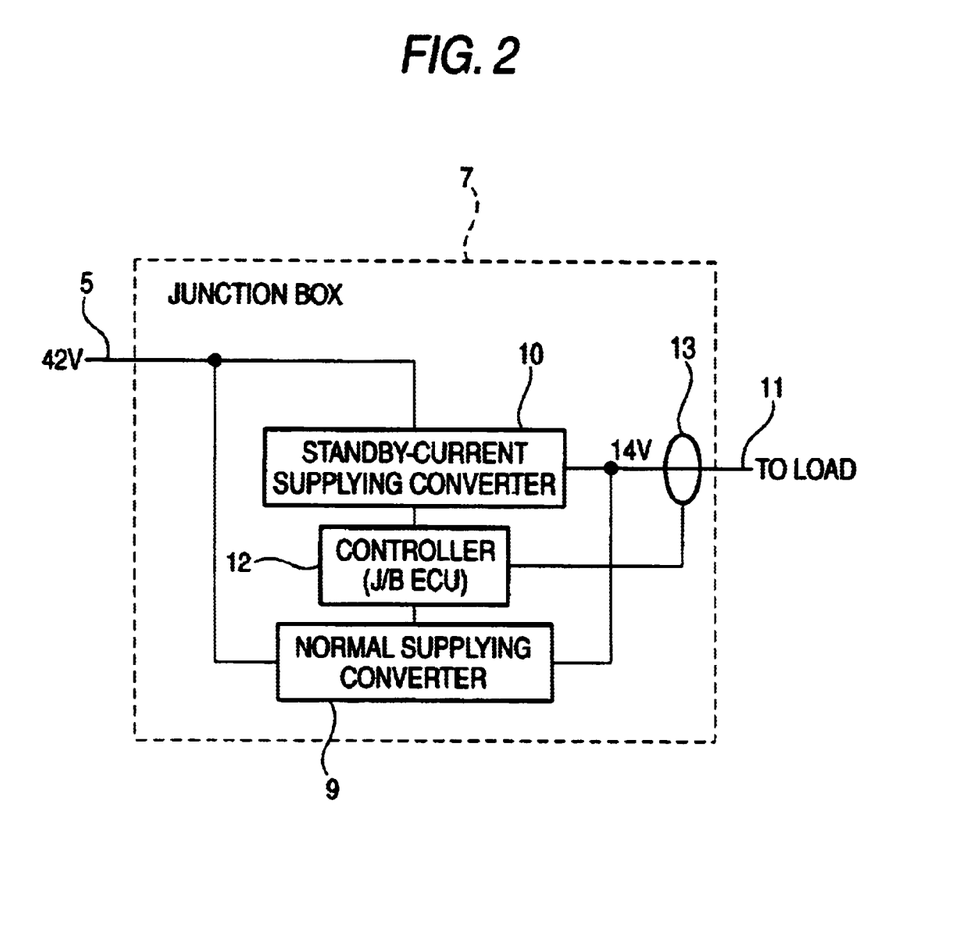
FIG. 2 is a block circuit diagram illustrating essential portions in a junction box shown n FIG. 1.
Figure 3:
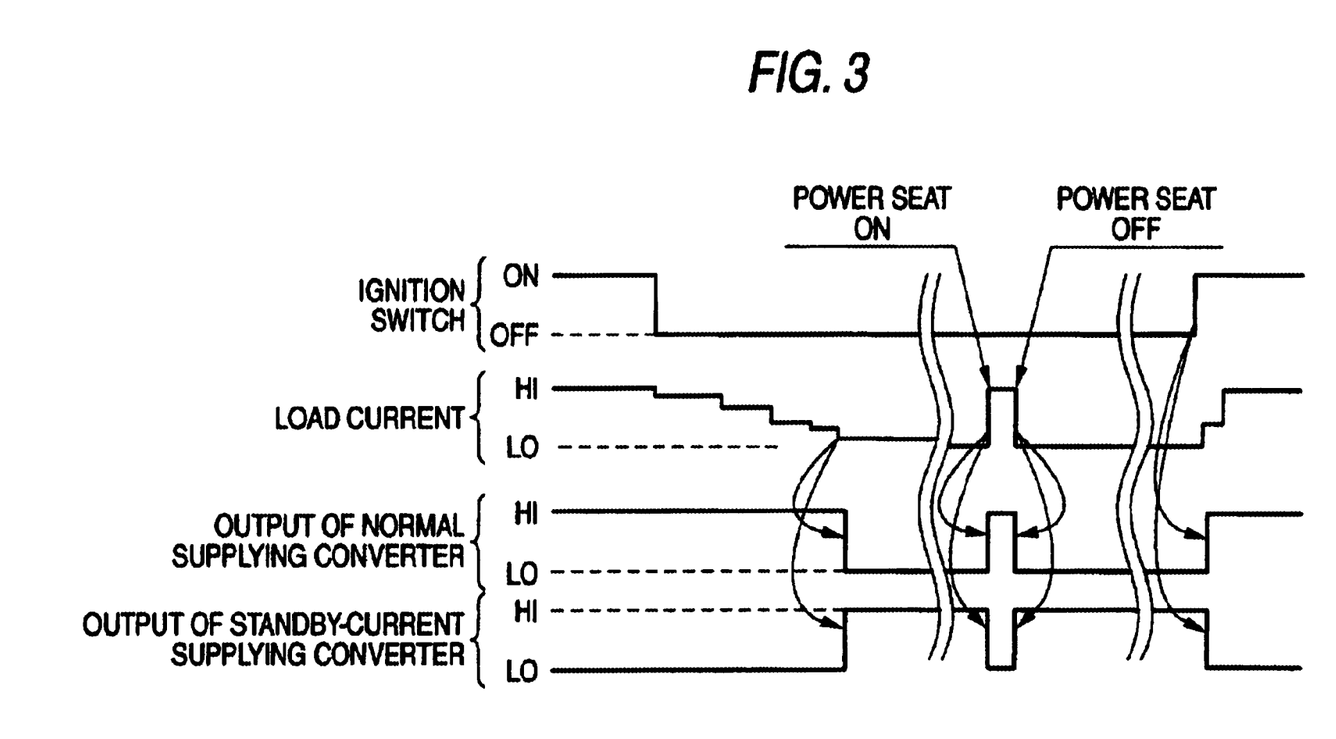
FIG. 3 is a diagram illustrating output waveforms and a timing chart for explaining the changeover of output between a normal supplying converter and a standby-current supplying converter shown in FIG. 2.
Figure 4:
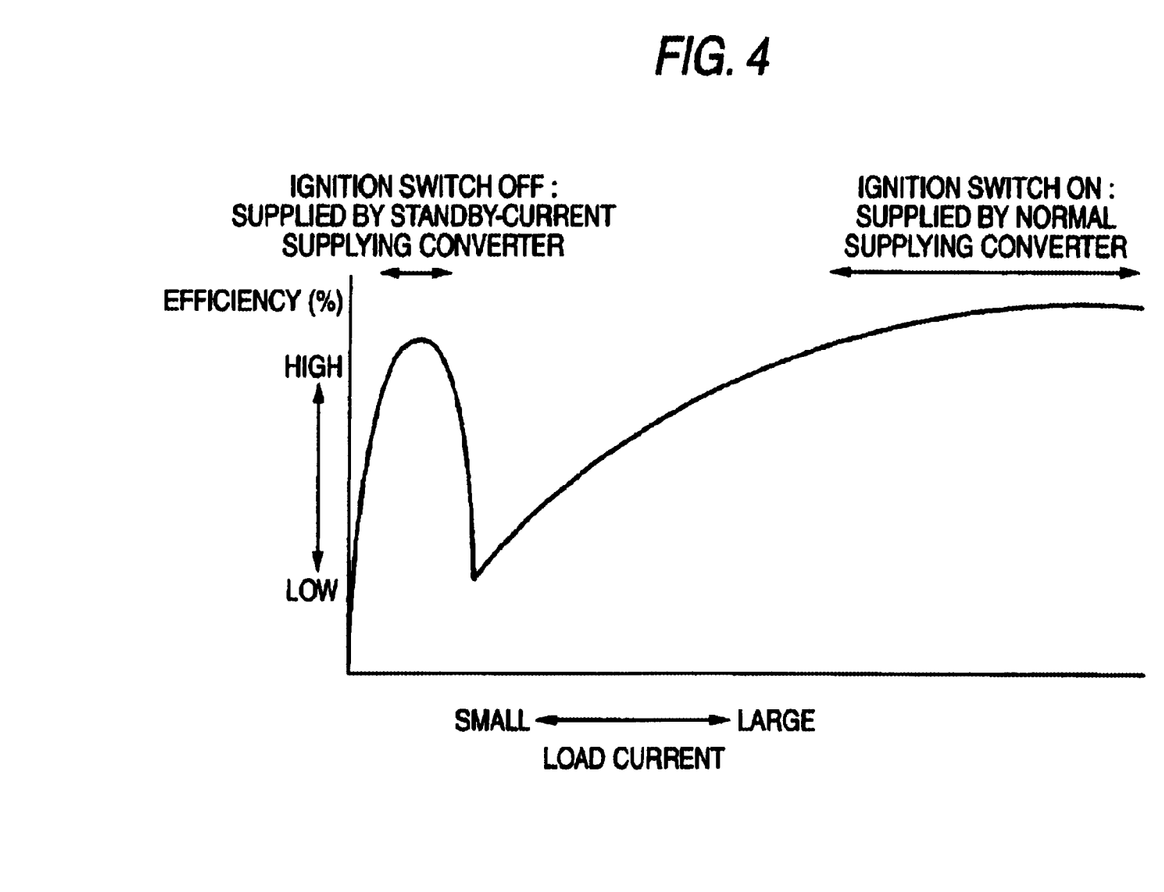
FIG. 4 is a characteristic diagram illustrating the conversion efficiency with respect to a load current.
Figure 5:
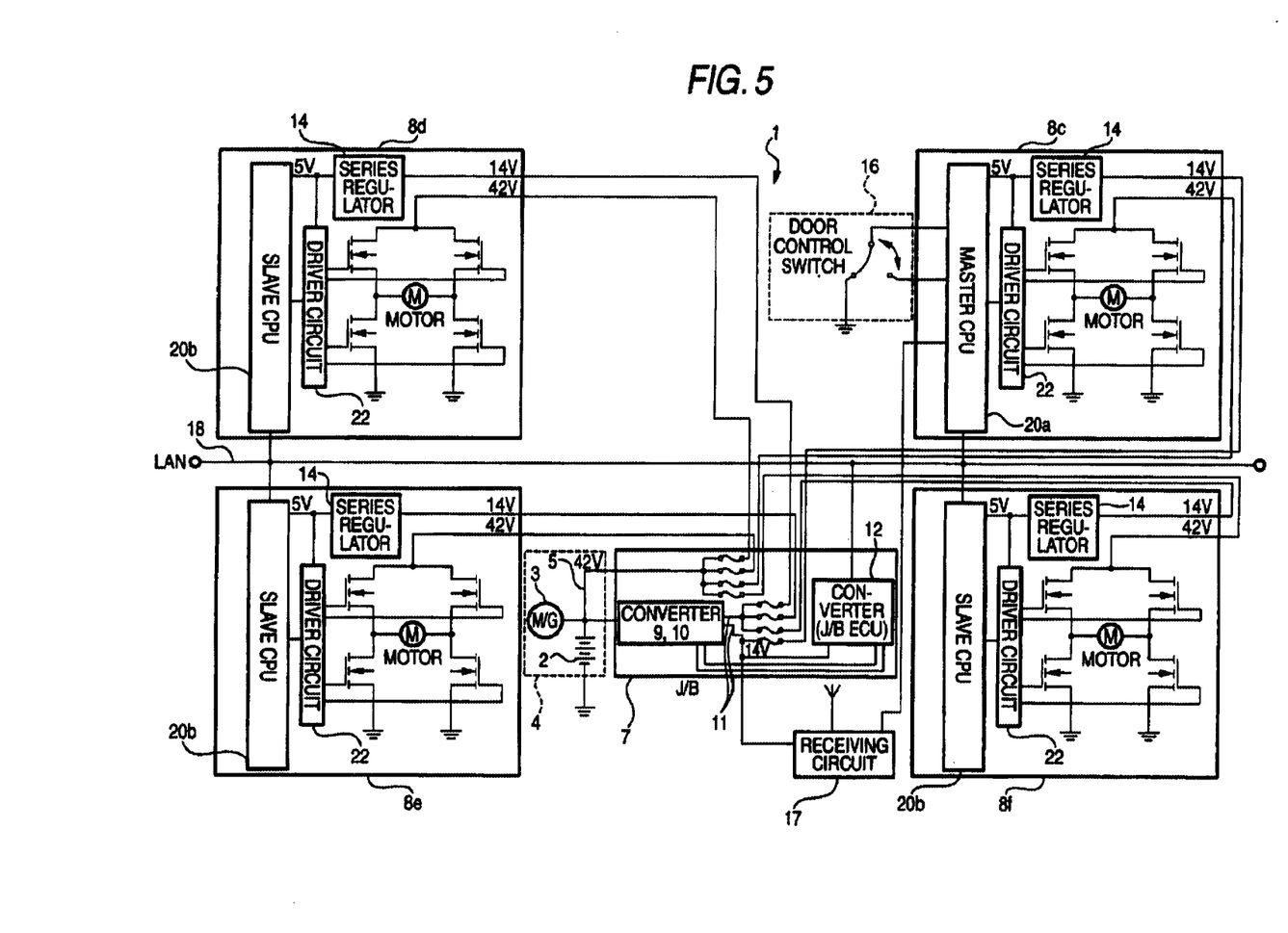
FIG. 5 is a block circuit diagram for explaining in greater detail the first embodiment of the power distribution system shown in FIG. 1.
Figure 6:
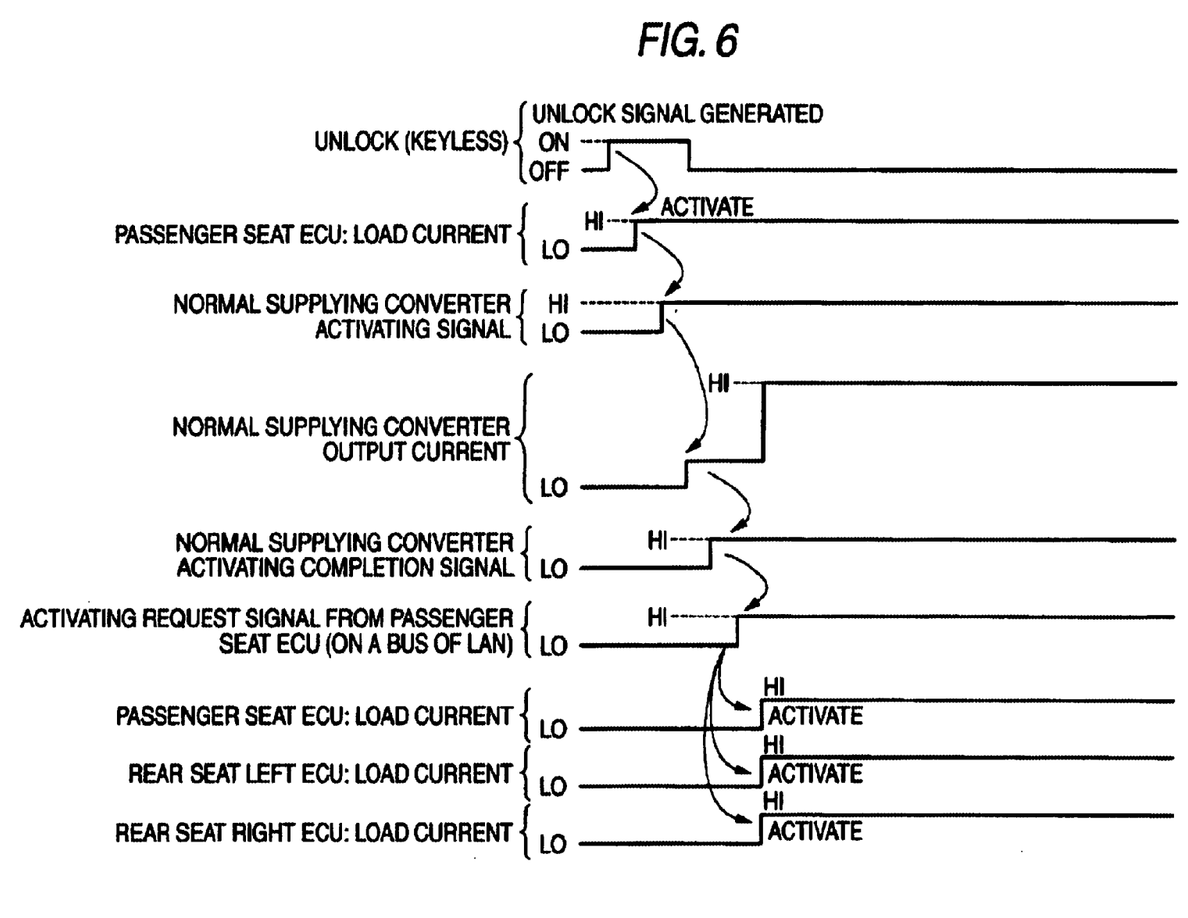
FIG. 6 is a diagram illustrating output waveforms and a timing chart for explaining the operation of the power distribution system shown in FIG. 5.

Referring now to the drawings, a detailed description will be given of the preferred embodiments of the invention.
First Embodiment FIGS. 1 to 6 illustrate a first embodiment of the invention, and shows by way of example a case in which the invention is particularly applied to a high-voltage vehicle in which a power supply unit with a 42-V output is mounted (i.e., the so-called 42 V vehicle). FIG. 1 is a block circuit diagram illustrating a schematic configuration of a power distribution system 1 in accordance with the invention; FIG. 2 is a block circuit diagram illustrating essential portions in a junction box 7 shown n FIG. 1; FIG. 3 is a diagram illustrating output waveforms and a timing chart for explaining the changeover of output between a normal supplying converter 9 and a standby-current supplying converter 10 shown in FIG. 2; FIG. 4 is a characteristic diagram illustrating the conversion efficiency with respect to a load current; FIG. 5 is a block circuit diagram for explaining in greater detail the power distribution system 1 shown in FIG. 1; and FIG. 6 is a diagram illustrating output waveforms and a timing chart for explaining the operation of the power distribution system 1 shown in FIG. 5.

As shown in FIG. 1, the power distribution system 1 has a power supply unit 4, and the power distribution system 4 has a rechargeable battery 2 and a motor/generator 3 for generating electricity by the rotation of an engine. High-voltage power of 42 V is supplied from this power supply unit 4 to three blocks 6a, 6b, and 6c through respective high-voltage power lines 5. For example, the block 6a corresponds to an engine room; the block 6b corresponds to a passenger compartment; and the block 6c corresponds to a trunk room. A junction box functioning as such as an upper power distribution unit and a plurality of electronic control units functioning as lower power distribution units are provided in each of the blocks 6a, 6b, and 6c. It should be noted that, in FIG. 1, the junction box 7 and the electronic control units 8a, 8b . . . , 8n are shown in the block 6b by way of example. However, a form may be adopted in which one junction box 7 is provided for all the blocks 6a, 6b, and 6c, and that junction box 7 is connected to a plurality of electronic control units in each of the blocks 6a, 6b, and 6c. The normal supplying converter 9 and the standby-current supplying converter 10 are incorporated in the junction box 7, and a power supply of a high voltage of 42 V is led to both of the normal supplying converter 9 and the standby-current supplying converter 10.

A DC/DC converter which excels in the conversion efficiency when the electric load is heavy is used as the normal supplying converter 9. A switching regulator, for instance, may be used as the normal supplying converter 9. The normal supplying converter 9 converts the power supply of a high voltage of 42 V to an intermediate voltage (e.g., 14 V) higher than the voltage for the electric load (e.g., 5 V). The output of the normal supplying converter 9 is supplied to all the electronic control units 8a to 8n through intermediate-voltage power lines 11. A DC/DC converter which excels in the conversion efficiency when the electric load is light is used as the standby-current supplying converter 10. A series regulator, for instance, may be used as the standby-current supplying converter 10. The standby-current supplying converter 10 converts the power supply of a high voltage of 42 V to an intermediate voltage (e.g., 14 V) higher than the voltage for the electric load (e.g., 5V). The output of the standby-current supplying converter 10 is supplied to the electronic control unit 8b, which must supply power to the electric load in the standby state when an ignition switch (not shown), for instance, is off, through intermediate-voltage power line 11. As such electronic control units 8b, it is possible to cite, for example, an electronic control unit for lighting various lamps, an electronic control unit for a centralized door lock system, an electronic control unit for a keyless entry system, an electronic control unit for a power seat, an electronic control unit for a theft prevention system, and the like.

As shown in FIG. 2, a controller 12 is incorporated in the junction box 7, and the driving of the normal supplying converter 9 and the standby-current supplying converter 10 is controlled by this controller 12. This controller 12 controls the normal supplying converter 9 and the standby-current supplying converter 10 on the basis of outputs of detection of the turning on and off of the ignition switch (not shown) and a current detection sensor 12. The intermediate-voltage power line 11 for effecting the common output of the normal supplying converter 9 and the standby-current supplying converter 10 controlled by this controller 12 is set as an object of detection by the current detection sensor 13.

Returning to FIG. 1, a plurality of electric loads (not shown) are connected to the respective electronic control units 8a to 8n, and the respective electronic control units 8a to 8n control these connected electric loads. Series regulators 14 are respectively incorporated in the electronic control units 8a to 8n, and the intermediate voltage of 14 V is led from the junction box 7 to each series regulator 14. Each series regulator 14 has a known configuration for stabilizing the output voltage by feeding back variations of the load voltage by using, for example, an operational amplifier, and converts the intermediate voltage of 14 V to an electric load-use voltage of 5 V. Outputs of these series regulators 14 are supplied to the plurality of electric loads (not shown) of the relevant series regulators 14 in charge.

Referring now to FIG. 3, a description will be given of the operation of the power distribution system 1. When the ignition switch (not shown) is turned on, the normal supplying converter 9 is set in a driven state by being controlled by the controller 12, and the normal supplying converter 9 converts the high voltage of 42 V at the power supply unit 4 to the intermediate voltage of 14 V. This intermediate voltage of 14 V is supplied to each of the electronic control units 8a to 8n, and the series regulator 14 of each of the electronic control units 8a to 8n converts the intermediate voltage of 14 V to the electric load-use voltage of 5 V and supplies it to each electric load (not shown).

When the ignition switch (not shown) is changed over from the on state to the off state, the load current is gradually reduced, and when the current detection sensor 13 detects that the load current has dropped to a level less than a set threshold value (predetermined value), the driving of the normal supplying converter 9 is stopped by the controller 12, and the standby-current supplying converter 10 is activateed to be driven. Consequently, the source of supplying the voltage to the electronic control unit 8b is changed from the normal supplying converter 9 to the standby-current supplying converter 10.

Incidentally, there are cases where a large load current is required even when the ignition switch (not shown) is off. For example, a large load current is required for the electronic control unit 8b for such as the activating of a centralized door lock system, the activating of a keyless entry system, the driving of a power seat, the lighting of various lamps, the activating of a theft prevention system, and the like. When the ignition switch is off, if the power seat, for instance, is driven to cause a large load current to flow, and if the current detection sensor 13 detects that the load current has risen to a level equal to or higher than the set threshold value, the driving of the standby-current supplying converter 10 is stopped by the controller 12, and the driving of the normal supplying converter 9 is started. Consequently, the source of supplying the voltage to the electronic control unit 8b is changed from the standby-current supplying converter 10 to the normal supplying converter 9. Then, if the current detection sensor 13 detects that the load current which rose has dropped to a level less than threshold value, the driving of the normal supplying converter 9 is stopped by the controller 12, and the standby-current supplying converter 10 is driven again.

When the ignition switch (not shown) is changed over from the off state to the on state, the driving of the standby-current supplying converter 10 is stopped by the controller 12 irrespective of the current value detected by the current detection sensor 13, and the driving of the normal supplying converter 9 is started. Namely, the voltage begins to be supplied from the normal supplying converter 9 to the electronic control units 8a to 8n.

With this power distribution system 1, because the normal supplying converter 9 supplies to the electronic control units 8a to 8n a voltage value (14 V) higher than the load-use voltage value (5 V), concerning a distant electric load it is unnecessary to take into account the demerit attributable to the voltage drop, so that it suffices if the normal supplying converters 9 are installed in a minimum number. Since the series regulators 14 generate a load-use voltage of high accuracy and supply it to the respective electric loads (not shown), high supply output accuracy is not required for the normal supplying converter 9, so that a capacitor and the like for ripple absorption may be small ones. Since the electronic control units 8a to 8n are respectively provided with the series regulators 14, it suffices if the series regulators 14 are prepared which are provided with those temperature characteristics and accuracy that are required for the electric loads (not shown) of which they are in charge.

Accordingly, the number of the normal supplying converters 9 can be reduced, high supply output accuracy is not required for both the normal supplying converter 9 and the standby-current supplying converter 10, and the inexpensive series regulator 14 instead of the expensive switching regulator is used for each electronic control unit, thereby making it possible to construct the power distribution system 1 at low cost. The normal supplying converter 9 and the standby-current supplying converter 10 of the junction box 7 are configured to have excellent conversion efficiency in correspondence with the load currents of which they are respectively in charge. Further, since the voltage values converted to the intermediate voltage values by these converters 9 and 10 are converted to the load-use voltage values, it is possible to improve the voltage conversion efficiency as the overall system, as shown in FIG. 4, and to lower the heat generation and improve fuel consumption.

Since the series regulators 14 generate the load-use voltage with high accuracy and supply it to the various electric loads (not shown), it is unnecessary to shield the intermediate-voltage power lines 11 from the normal supplying converter 9 to each series regulator 14.

The arrangement provided is such that the standby-current supplying converter 10, which has high conversion efficiency when the electric load is light and converts the high-voltage power supply from the power supply unit 4 to an intermediate voltage, is provided in the junction box 7, and power is supplied to the electronic control unit 8b by this standby-current supplying converter 10 and the normal supplying converter 9. Therefore, the standby current can be collectively supplied by the standby-current supplying converter 10 which has high conversion efficiency when the electric load is light. Therefore, the dark current is suppressed to a minimum, thereby making it possible to prevent the running down of the battery.

The current detection sensor 13 for detecting the value of the current supplied from the junction box 7 to each electronic control unit is provided. Consequently, when the ignition switch is off and when the current value detected by the current detection sensor 13 is equal to or higher than the predetermined value, power is supplied with the normal supplying converter 9 set in an operating state. When the ignition switch is off and when the current value detected by the current detection sensor 13 is less than the predetermined value, the normal supplying converter 9 is set in a non-operating state, and power is supplied by the standby-current supplying converter 10 alone. For this reason, since the changeover between the converters 9 and 10 is effected on the basis of the current value detected by the current detection sensor 13 when the ignition switch is off, control of the converter changeover based on an actual value of the current value is made possible.

Since the intermediate voltage is 14V which is lower than the supply voltage (42 V) and is higher than the electric load-use voltage (5 V), the supply voltage is converted to a voltage close to the electric load-use voltage by the normal supplying converter 9 which has high conversion efficiency when the electric load is heavy. Therefore, it is possible to improve the voltage conversion efficiency of the system as a whole and reduce heat generation, thereby making it possible to improve fuel consumption. Incidentally, although the intermediate voltage is preferably set to a value between 6 V and 14 V, the intermediate voltage needs to be set to a voltage value which does not cause any trouble due to the voltage drop for the remote series regulator 14. In a case where the intermediate voltage value is set so that the difference between the input voltage value and the output voltage value of the series regulator 14 becomes small, it is possible to suppress the heat generation of the series regulator 14 to a low level and make the size of the series regulator 14 small. Meanwhile, in the case where the intermediate voltage value is set to 14 V as in this embodiment, general-purpose electronic control units can be used as lower power distribution units, and can be jointly used as power supplies for general-purpose electric components compatible with 14 V, so that the power distribution system 1 can be constructed at low cost.

As described above, the electronic control unit 8b in FIG. 1 is an electronic control unit which must supply power to an electric load in the standby state even when, for example, the ignition switch (not shown) is off. For this reason, the output of the standby-current supplying converter 10 is supplied to the electronic control unit 8b through the intermediate-voltage power line 11. The electronic control unit 8b is an electronic control unit for which the power consumption of the electric load changes substantially between the active state and the standby state. As described above, the current detection sensor 13 detects an increase or a decrease of the load current flowing across the intermediate-voltage power line 11 with respect to the set threshold value, and the driving of the normal supplying converter 9 and the standby-current supplying converter 10 can be changed over and controlled appropriately by the controller 12 in correspondence with the result of detection thereof. However, in the case where a plurality of electronic control units such as the electronic control unit 8b are present, by taking into consideration the standby-current supplying converter 10 on which a large burden is possibly imposed by coping even momentarily with the power consumption which changes substantially owing to the transition of those electric loads from the standby state to the active state, in the invention, the power distribution system 1 is structured in which a burden is not imposed on the standby-current supplying converter 10 as much as possible at the time of the changeover from the standby-current supplying converter 10 to the normal supplying converter 9 so that the detection by the current detection sensor 13 need not be relied upon. Details of such a power distribution system 1 will be described with reference to FIGS. 5 and 6. Further, a description will be given of the reduction of the dark current by the power distribution system 1 with reference to FIGS. 5 and 6.

As shown in FIG. 5, the plurality of electronic control units 8c to 8f which function as lower power distribution units are electrically connected to the power supply unit 4 and the junction box 7 which functions as an upper power distribution unit. In the same way as the electronic control unit 8b shown in FIG. 1, these electronic control units 8c to 8f are electronic control units for which the power consumption of the electric loads change substantially between the The present disclosure relates to the subject matter contained in Japanese patent application Nos. 2000-195506 (filed on Jun. 29, 2001) and 2001-105525 (filed on Apr. 4, 2001), which are expressly incorporated herein by reference in their entireties. active state and the standby state, and are electronic control units for the combined system of a centralized door lock system 16 and a keyless entry system 17. In FIG. 5, the driver seat ECU corresponds to the electronic control unit 8c, the passenger seat ECU corresponds to the electronic control unit 8d, the rear seat left ECU corresponds to the electronic control unit 8e, and the rear seat right ECU corresponds to the electronic control unit 8f. The intermediate-voltage lines 11 for effecting the common output of the normal supplying converter 9 and the standby-current supplying converter 10 are connected to at least the electronic control unit 8c.

It should be noted that the controller 12 in the junction box 7 functions as a junction box ECU for controlling a local area network (LAN) 18, and the arrangement provided is such that all the electronic control units 8a to 8n are connected to this LAN, thereby permitting mutual communication. A plurality of fuses are inserted in the high-voltage power lines 5 and the intermediate-voltage power lines 11 for circuit protection. A master CPU 20a, slave CPUs 20b, driver circuits 22, and the like are provided in the electronic control units 8c to 8f as electric loads. The master CPU 20a is connected to the centralized door lock system 16 and the keyless entry system 17 through signal lines so as to be able to receive a predetermined command signal generated by the unlocking operation in the centralized door lock system 16 or the unlocking operation in the keyless entry system 17. Each driver circuit 22 drives a motor for effecting the locking/unlocking operation of a vehicle door in response to the command signal from the master CPU 20a or the slave CPU 20b.

Next, referring to FIG. 6, a description will be given of the operation when the ignition switch (not shown) of the power distribution system 1 in FIG. 5 is off. When the ignition switch is off, power necessary for the standby state is being supplied from the standby-current supplying converter 10 to only the electronic control unit 8c having the master CPU 20a. Power is not supplied to the other electronic control units 8d to 8f. Accordingly, it is possible to reduce unwanted dark current. Even when the master CPU 20a receives a predetermined command signal generated by the unlocking operation in the centralized door lock system 16 or the unlocking operation in the keyless entry system 17, the master CPU 20a does not immediately transmit an activating signal to the slave CPUs 20b. At this time, the power necessary for the electronic control unit 8c is being supplied by the standby-current supplying converter 10, and the master CPU 20a transmits a command signal to the driver circuit 22 and drives the motor to effect the unlocking operation of the door. The master CPU 20a then transmits an activating request signal to the controller 12 through the LAN 18 to activate the normal supplying converter 9. After activating the normal supplying converter 9, the controller 12 transmits an activating completion signal to the master CPU 20a through the LAN 18. Upon receipt of this activating completion signal, the master CPU 20a transmits for the first time the activating signal to the slave CPUs 20b through the LAN 18. Consequently, power is supplied to all the electronic control units 8c to 8f from the normal supplying converter 9, whereupon the slave CPUs 20b transmit command signals to the driver circuits 22 to drive the motors for effecting the door unlocking operation. Thus power supply is changed over from the standby-current supplying converter 10 to the normal supplying converter 9 smoothly without trouble. Accordingly, since it suffices if the standby-current supplying converter 10 supplies power until the activating of the normal supplying converter 9 only for driving the electric load of the electronic control unit 8c having the master CPU 20a, the power capacity of the standby-current supplying converter 10 can be made small, and unwanted dark current can be reduced.

Since the series regulators 14 generate electric load-use voltages (e.g., 5 V) of high accuracy and supply them to the respective electric loads, high supply output accuracy is not required for the normal supplying converter 9. As for the series regulators 14, it suffices if those which are provided with the temperature characteristics and accuracy required for the electric loads of which they are in charge are prepared. As the normal supplying converter 9, one having high conversion efficiency in input/output power when the electric loads are heavy is adopted, and as the standby-current supplying converter 10, one having high conversion efficiency in input/output power when the electric loads are light is adopted. Therefore, low power consumption of the overall power distribution system 1 is attained, and unwanted dark current can be reduced further.

Second Embodiment

Figure 7:
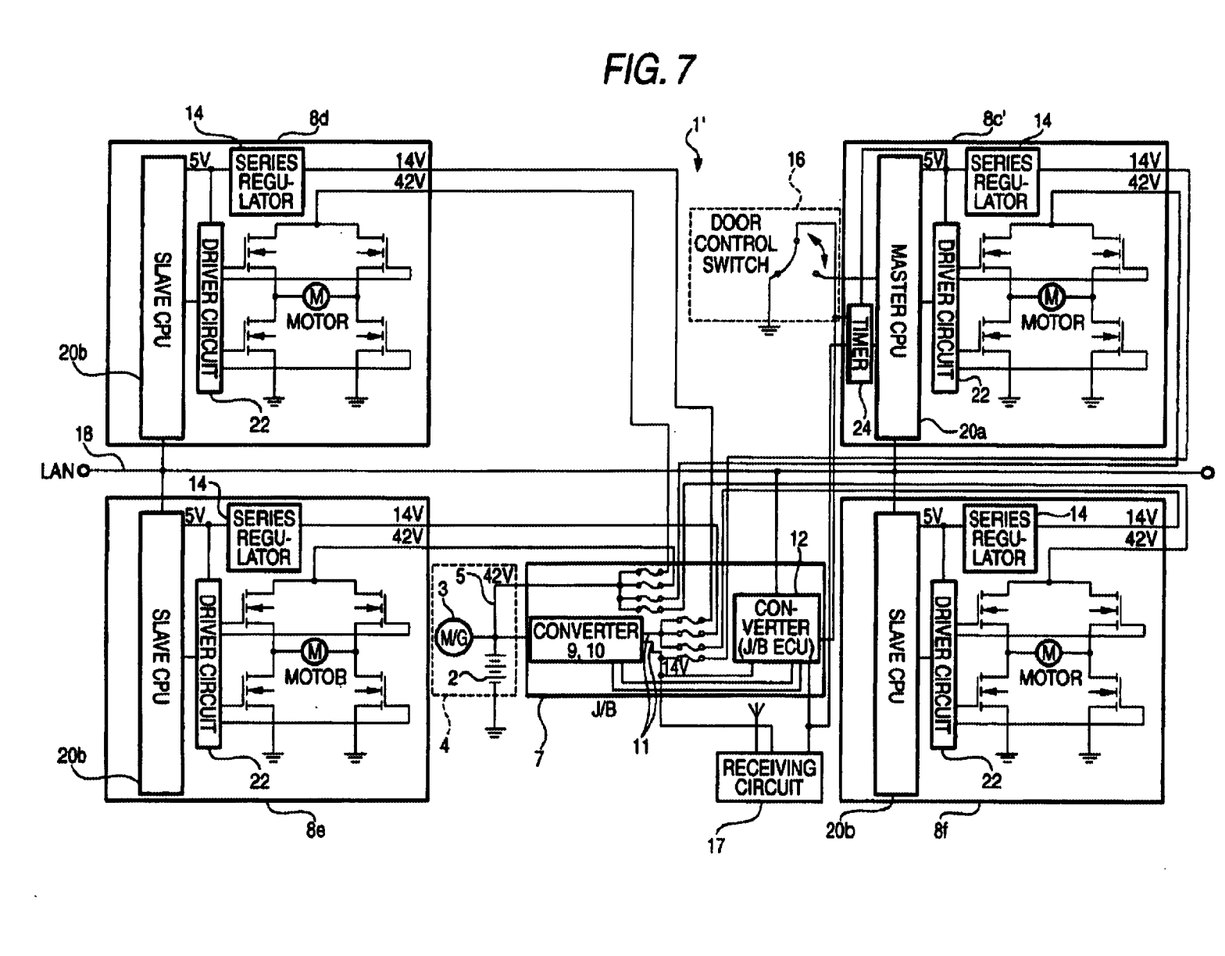
FIG. 7 is a block circuit diagram for explaining in detail a second embodiment of the power distribution system of the invention.
Figure 8:
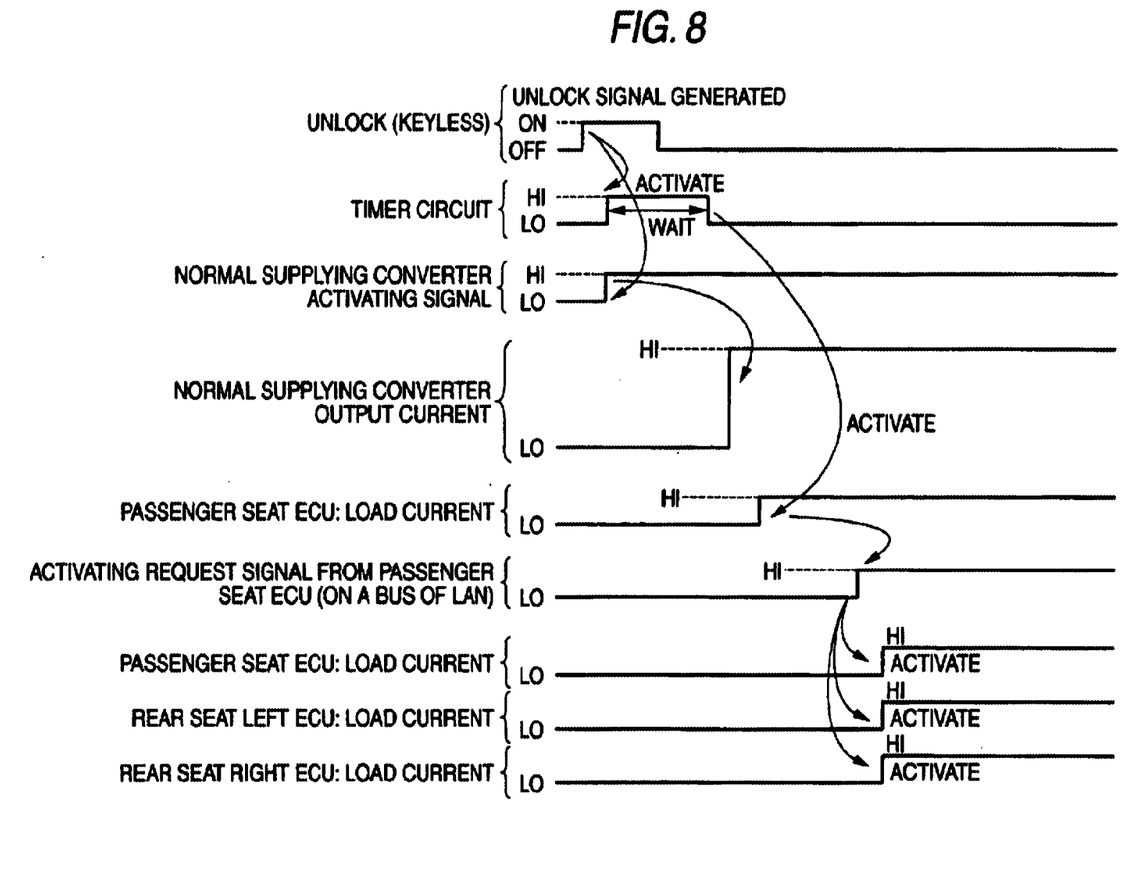
FIG. 8 is a diagram illustrating output waveforms and a timing chart for explaining the operation of the power distribution system shown in FIG. 7.

FIGS. 7 and 8 illustrate a second embodiment of the invention. FIG. 7 is a block circuit diagram for explaining in detail a power distribution system 1' in accordance with the invention, and FIG. 8 is a diagram illustrating output waveforms and a timing chart for explaining the operation of the power distribution system 1' shown in FIG. 7. In the power distribution system 1' in accordance with this second embodiment, a timer circuit 24 is newly added in comparison with the power distribution system 1 in accordance with the first embodiment. The timer circuit 24 is provided in an electronic control unit 8c', receives the power supply from the output of the series regulator 14 of the electronic control unit 8c', and is connected to the master CPU 20a through a signal line so as to be able to transmit the activating completion signal. The controller 12 and the timer circuit 24 are connected to the centralized door lock system 16 and the keyless entry system 17, respectively, through signals lines so as to be able to receive predetermined command signals from the centralized door lock system 16 and the keyless entry system 17. Predetermined time required for the normal supplying converter 9 to reach a sufficiently active state from a stopped state is stored in advance in the timer circuit 24. The other arrangements are substantially identical to those of the first embodiment, and a description thereof will be omitted to avoid a redundant explanation. It should be noted that portions of the identical configuration in the drawings are denoted by the same reference numerals as those of the first embodiment for the clarification's sake.

Next, referring to FIG. 8, a description will be given of the operation when the ignition switch (not shown) of the power distribution system 1' in FIG. 7 is off. When the ignition switch is off, power necessary for the standby state is being supplied from the standby-current supplying converter 10 to only the electronic control unit 8c' having the master CPU 20a. Power is not supplied to the other electronic control units 8d to 8f. Accordingly, it is possible to reduce unwanted dark current. The controller 12 and the timer circuit 24 directly receive simultaneously a predetermined command signal generated by the unlocking operation in the centralized door lock system 16 or the unlocking operation in the keyless entry system 17. Upon receipt (i.e., input) of this command signal, the controller 12 activates the normal supplying converter 9, but the timer circuit 24 does not immediately activate the master CPU 20a but starts counting the time, and counts up to a predetermined time at the shortest. Then, when the time when the normal supplying converter 9 can be sufficiently activateed (i.e., the predetermined time) is reached, the timer circuit 24 transmits the activating completion signal to the master CPU 20a. As a result, necessary power is supplied from the normal supplying converter 9 to the electronic control unit 8c' having the master CPU 20a. The master CPU 20a transmits a command signal to the driver circuit 22 and drives the motor to effect the unlocking operation of the door. The master CPU 20a then transmits the activating signal to the slave CPUs 20b through the LAN 18. Consequently, power is supplied to all the electronic control units 8c' to 8f from the normal supplying converter 9, whereupon the slave CPUs 20b transmit command signals to the driver circuits 22 to drive the motors for effecting the door unlocking operation. Thus power supply is changed over from the standby-current supplying converter to the normal supplying converter smoothly without trouble. Accordingly, since it is not necessary for the standby-current supplying converter 10 to supply power to all the electric loads of the electronic control unit 8c' having the master CPU 20a, the power capacity of the standby-current supplying converter 10 can be made even smaller, and unwanted dark current can be reduced.

Since the series regulators 14 generate electric load-use voltages (e.g., 5 V) with high accuracy and supply them to the respective electric loads, high supply output accuracy is not required for the normal supplying converter 9. As for the series regulators 14, it suffices if those which are provided with the temperature characteristics and accuracy required for the electric loads of which they are in charge are prepared. As the normal supplying converter 9, one having high conversion efficiency in input/output power when the electric loads are heavy is adopted, and as the standby-current supplying converter 10, one having high conversion efficiency in input/output power when the electric loads are light is adopted. Therefore, low power consumption of the overall power distribution system 1' is attained, and unwanted dark current can be reduced further.

Third Embodiment

Figure 9:
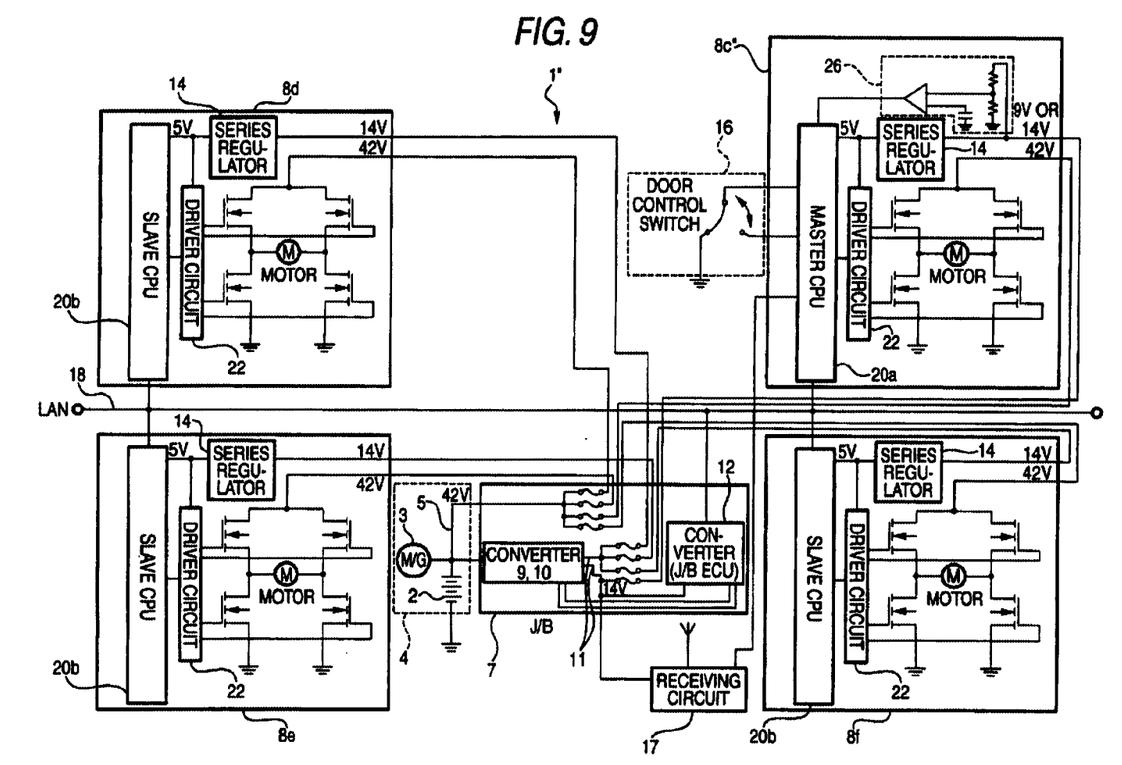
FIG. 9 is a block circuit diagram for explaining in detail a third embodiment of the power distribution system of the invention.
Figure 10:
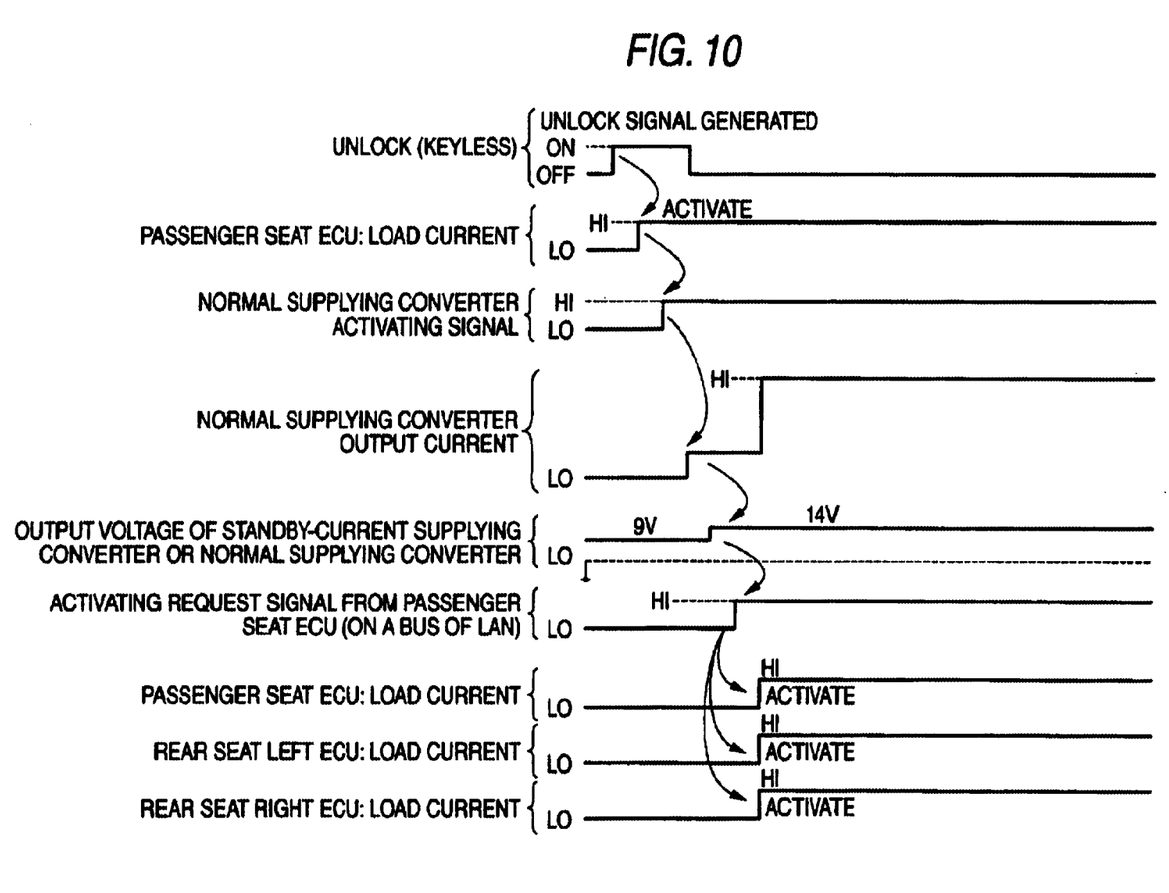
FIG. 10 is a diagram illustrating output waveforms and a timing chart for explaining the operation of the power distribution system shown in FIG. 9.

FIGS. 9 and 10 illustrate a third embodiment of the invention. FIG. 9 is a block circuit diagram for explaining in detail a power distribution system 1" in accordance with the invention, and FIG. 10 is a diagram illustrating output waveforms and a timing chart for explaining the operation of the power distribution system 1" shown in FIG. 9. In the power distribution system 1" in accordance with this third embodiment, a comparator 26 is newly added in comparison with the power distribution system 1 in accordance with the first embodiment. The comparator 26 is provided in an electronic control unit 8c" having the master CPU 20a, and inputs to the master CPU 20a a determination signal representing whether the voltage at the intermediate-voltage power line 11 is a first intermediate voltage (e.g., 14 V) or a second intermediate voltage (e.g., 9 V). The other arrangements are substantially identical to those of the first embodiment, and a description thereof will be omitted to avoid a redundant explanation. It should be noted that portions of the identical configuration in the drawings are denoted by the same reference numerals as those of the first embodiment for the clarification's sake.

Next, referring to FIG. 10, a description will be given of the operation when the ignition switch (not shown) of the power distribution system 1" in FIG. 9 is off. When the ignition switch is off, power of a second intermediate voltage (e.g., 9 V) necessary for the standby state is being supplied from the standby-current supplying converter 10 to only the electronic control unit 8c" having the master CPU 20a. Power is not supplied to the other electronic control units 8d to 8f. Accordingly, it is possible to reduce unwanted dark current. Even when the master CPU 20a receives a predetermined command signal generated by the unlocking operation in the centralized door lock system 16 or the unlocking operation in the keyless entry system 17, the master CPU 20a does not immediately transmit an activating signal to the slave CPUs 20b. At this time, the power necessary for the electronic control unit 8c" is being supplied by the standby-current supplying converter 10, and the master CPU 20a transmits a command signal to the driver circuit 22 and drives the motor to effect the unlocking operation of the door. The master CPU 20a then transmits an activating request signal to the controller 12 through the LAN 18 to activate the normal supplying converter 9. The master CPU 20a transmits the activating signal to the slave CPUs 20b through the LAN 18 in response to the determination signal of the comparator 26 representing the first intermediate voltage (e.g., 14 V) which is the output voltage of the normal supplying converter 9. Consequently, power is supplied to all the electronic control units 8c" to 8f from the normal supplying converter 9, whereupon the slave CPUs 20b transmit command signals to the driver circuits 22 to drive the motors for effecting the door unlocking operation. Thus power supply is changed over from the standby-current supplying converter 10 to the normal supplying converter 9 smoothly without trouble. Accordingly, since it is not necessary for the standby-current supplying converter 10 to supply power to all the electric loads of the electronic control unit 8c" having the master CPU 20a, the power capacity of the standby-current supplying converter 10 can be made even smaller, and unwanted dark current can be further reduced. It should be noted that the second intermediate voltage should preferably be lower than the first intermediate voltage.

Since the series regulators 14 generate electric load-use voltages (e.g., 5 V) of high accuracy and supply them to the respective electric loads, high supply output accuracy is not required for the normal supplying converter 9. As for the series regulators 14, it suffices if those which are provided with the temperature characteristics and accuracy required for the electric loads of which they are in charge are prepared. As the normal supplying converter 9, one having high conversion efficiency in input/output power when the electric loads are heavy is adopted, and as the standby-current supplying converter 10, one having high conversion efficiency in input/output power when the electric loads are light is adopted. Therefore, low power consumption of the overall power distribution system 1" is attained, and unwanted dark current can be reduced further.

It should be noted that the invention is not limited to the above-described embodiments, and modifications, improvements, and the like are possible, as required. In addition, the shapes, forms, number, places of disposition, and the like of the respective constituent elements in the above-described embodiments are arbitrary and are not limited insofar as the invention can be attained.

As described above, in accordance with the power distribution system of the invention, it suffices if power is supplied to only the lower power distribution unit having the master CPU among the plurality of lower power distribution units whose electric loads are in the standby state, and it is unnecessary to supply power to the other lower power distribution units, thereby making it possible to reduce the unwanted dark current. Thus when the electric loads are in the standby state, and when, for example, the unlocking operation in the keyless entry system is effected, and a predetermined command signal thereby generated is inputted, the master CPU transmits an activating request signal to the controller to activate the normal supplying converter. After activating the normal supplying converter, the controller transmits an activating completion signal to the master CPU, and the master CPU transmits an activating signal to the slave CPUs. Consequently, power is supplied to all the lower power distribution units from the normal supplying converter, and the electric loads are respectively driven. Therefore, power supply is changed over from the standby-current supplying converter to the normal supplying converter smoothly without trouble. Accordingly, since it suffices if the standby-current supplying converter supplies power until the activating of the normal supplying converter only for driving the electric load of the lower power distribution unit having the master CPU, the power capacity of the standby-current supplying converter can be made small, and unwanted dark current can be reduced.

In accordance with the power distribution system according to the invention, it suffices if power is supplied to only the lower power distribution unit having the master CPU among the plurality of lower power distribution units whose electric loads are in the standby state, and it is unnecessary to supply power to the other lower power distribution units, thereby making it possible to reduce the unwanted dark current. Thus when the electric loads are in the standby state, the unlocking operation in the keyless entry system, for example, is effected, and a predetermined command signal thereby generated is inputted directly to the controller and the timer circuit simultaneously. The controller activates the normal supplying converter upon the input of this command signal, but the timer circuit does not immediately activate the master CPU, but starts counting the time. When the predetermined time is reached, the timer circuit transmits the activating completion signal to the master CPU. As a result, power is supplied from the normal supplying converter to the electronic control unit having the mm, and its electric load is driven. The master CPU then transmits the activating signal to the slave CPUs, with the result that power is supplied to all the electronic control units from the normal supplying converter so as to drive the electric loads, respectively. Thus power supply is changed over from the standby-current supplying converter to the normal supplying converter smoothly without trouble. Accordingly, since it is not necessary for the standby-current supplying converter to supply power to all the electric loads of the lower power distribution unit having the master CPU, the power capacity of the standby-current supplying converter can be made even smaller, and unwanted dark current can be further reduced.

In accordance with the power distribution system according to the present invention, it suffices if power is supplied to only the lower power distribution unit having the master CPU among the plurality of lower power distribution units whose electric loads are in the standby state, and it is unnecessary to supply power to the other lower power distribution units, thereby making it possible to reduce the unwanted dark current. Thus when the electric loads are in the standby state, and when, for example, the unlocking operation in the keyless entry system is effected, and a predetermined command signal thereby generated is inputted, the master CPU transmits an activating request signal to the controller to activate the normal supplying converter. In response to a determination signal of the comparator representing the first intermediate voltage which is the output voltage of the normal supplying converter, the master CPU transmits an activating signal to the slave CPUs. Consequently, power is supplied to all the lower power distribution units from the normal supplying converter, and the electric loads are respectively driven. Therefore, power supply is changed over from the standby-current supplying converter to the normal supplying converter smoothly without trouble. Accordingly, since it suffices if the standby-current supplying converter supplies power until the activating of the normal supplying converter only for driving the electric load of the lower power distribution unit having the master CPU, the power capacity of the standby-current supplying converter can be made small, and unwanted dark current can be reduced.

In accordance with the power distribution systems according to the invention, since the series regulators generate electric load-use voltages with high accuracy and supply them to the respective electric loads, high supply output accuracy is not required for the normal supplying converter. As for the series regulators, it suffices if those which are provided with the temperature characteristics and accuracy required for the electric loads of which they are in charge are prepared. In addition, as the normal supplying converter, one having high conversion efficiency in input/output power when the electric loads are heavy is adopted, and as the standby-current supplying converter, one having high conversion efficiency in input/output power when the electric loads are light is adopted. Therefore, low power consumption of the overall system is attained, and unwanted dark current can be reduced further.

What is claimed is:

1. A power distribution system comprising:
   an upper power distribution unit connected to a power supply unit through a high-voltage power line for receiving power supply of a high voltage from the power supply unit;
   a plurality of lower power distribution units connected to the upper power distribution unit through a plurality of intermediate-voltage power lines for receiving from the upper power distribution unit power supply of an intermediate voltage lower than the high voltage, converting the intermediate voltage to a load-use voltage lower than the intermediate voltage and supplying power to electric loads, respectively;
   a normal supplying converter provided in the upper power distribution unit for converting the high voltage to the intermediate voltage and supplying the power of the intermediate voltage to the plurality of intermediate-voltage power lines;
   a standby-current supplying converter connected in parallel to the normal supplying converter in the upper power distribution unit for converting the high voltage to the intermediate voltage and supplying the power of the intermediate voltage to one of the plurality of intermediate-voltage power lines;
   a controller provided in the upper power distribution unit for changing the driving between the normal supplying converter and the standby-current supplying converter;
   a master CPU provided in the lower power distribution unit to which power can be supplied from the standby-current supplying converter through the one of the plurality of intermediate-voltage power line, constituting at least a portion of the electric load; and
   at least one slave CPU provided in the lower power distribution units other than the lower power distribution unit having the master CPU, constituting at least portions of the electric loads,
   wherein the master CPU activates the normal supplying converter in accordance with a predetermined command signal inputted when power is supplied from the standby-current supplying converter to the lower power distribution unit having the master CPU, whereby power is supplied from the normal supplying converter to the plurality of lower power distribution units to drive the electric loads, respectively.

2. The power distribution system according to claim 1, wherein the master CPU transmits an activating request signal to the controller to activate the normal supplying converter.

3. The power distribution system according to claim 2, wherein the controller transmits an activating completion signal to the master CPU after activating the normal supplying converter, and the master CPU transmits an activating signal to the at least one slave CPU.

4. The power distribution system according to claim 1 further comprising a timer circuit which is connected to the master CPU, and stores predetermined time required for the normal supplying converter to reach an active state from a stopped state,
   wherein in accordance with a predetermined command signal inputted to the controller and the timer circuit when the standby-current supplying converter is driven, the controller activates the normal supplying converter and the timer circuit counts time until reaching at at least the predetermined time, the timer circuit transmits an activating completion signal to the master CPU after the predetermined time is reached, and the master CPU transmits an activating signal to the at least one slave CPU, whereby power is supplied from the normal supplying converter to the plurality of lower power distribution units to drive the electric loads, respectively.

5. The power distribution system according to claim 1, further comprising a comparator provided in the lower power distribution unit having the master CPU for inputting to the master CPU a determination signal representing whether the voltage at the intermediate-voltage power line is a first intermediate voltage or a second intermediate voltage,
   wherein the normal supplying converter converts the high voltage to the first intermediate voltage, and the standby-current supplying converter converts the high voltage to the second intermediate voltage different from the first intermediate voltage, and
   wherein the master CPU transmits an activating signal to the at least one slave CPU in response to a determination signal of the comparator representing the first intermediate voltage, whereby power is supplied from the normal supplying converter to the plurality of lower power distribution units to drive the electric loads, respectively.

6. The power distribution system according to claim 5, wherein the first intermediate voltage is higher than the second intermediate voltage.

7. The power distribution system according to claim 1, further comprising: series regulators respectively provided in the lower power distribution units for convert the intermediate voltage to the load-use voltage,
   wherein the normal supplying converter has high conversion efficiency of input/output power when the electric load is heavy, whereas the standby-current supplying converter has high conversion efficiency of input/output power when the electric load is light.

8. The power distribution system according to claim 1 further comprising a detection sensor for detecting current supplied from the upper power distribution unit to the lower power distribution unit,
   wherein the controller stops the standby-current supplying converter and activate the normal supplying converter on the basis of the current value detected by the detection sensor.

9. The power distribution system according to claim 8, wherein when an ignition is changed over from off state to on state, the controller stops the standby-current supplying converter and activate the normal supplying converter on the basis of the current value detected by the detection sensor irrespective of the current value detected by the current detection sensor.

* * * * *